United States Patent

Tulagin

[15] 3,669,872

[45] June 13, 1972

[54] IMAGING SYSTEM

[72] Inventor: Vsevolod Tulagin, Rochester, N.Y.

[73] Assignee: Xerox Corporation, Rochester, N.Y.

[22] Filed: Jan. 29, 1970

[21] Appl. No.: 12,532

Related U.S. Application Data

[62] Division of Ser. No. 675,892, Oct. 17, 1967.

[52] U.S. Cl. .............................. 204/299, 204/300, 204/181
[51] Int. Cl. ..................................... B01k 5/02, C23b 13/00
[58] Field of Search ....................... 204/181, 299, 300; 96/1; 355/3

[56] References Cited

UNITED STATES PATENTS 3,565,614   2/1971   Carreira et al. ......................... 204/181

*Primary Examiner*—John H. Mack
*Assistant Examiner*—A. C. Prescott
*Attorney*—Ronald Zibelli and James A. Ralabate

[57] ABSTRACT

A method of selectively producing positive or negative photoelectrophoretic copies is described. A suspension of photosensitive particles sensitive to a first range of wavelengths is placed between two electrodes, one of which is transparent and the other of which has a surface sensitive to a second range of wavelengths. When a field is imposed across the suspension and an image is projected through the transparent electrode using radiation in only one of said first and second ranges, a positive or negative image is formed on a given electrode, depending on whether the electrode or the suspension is sensitive to the radiation used.

3 Claims, 1 Drawing Figure

PATENTED JUN 13 1972 3,669,872
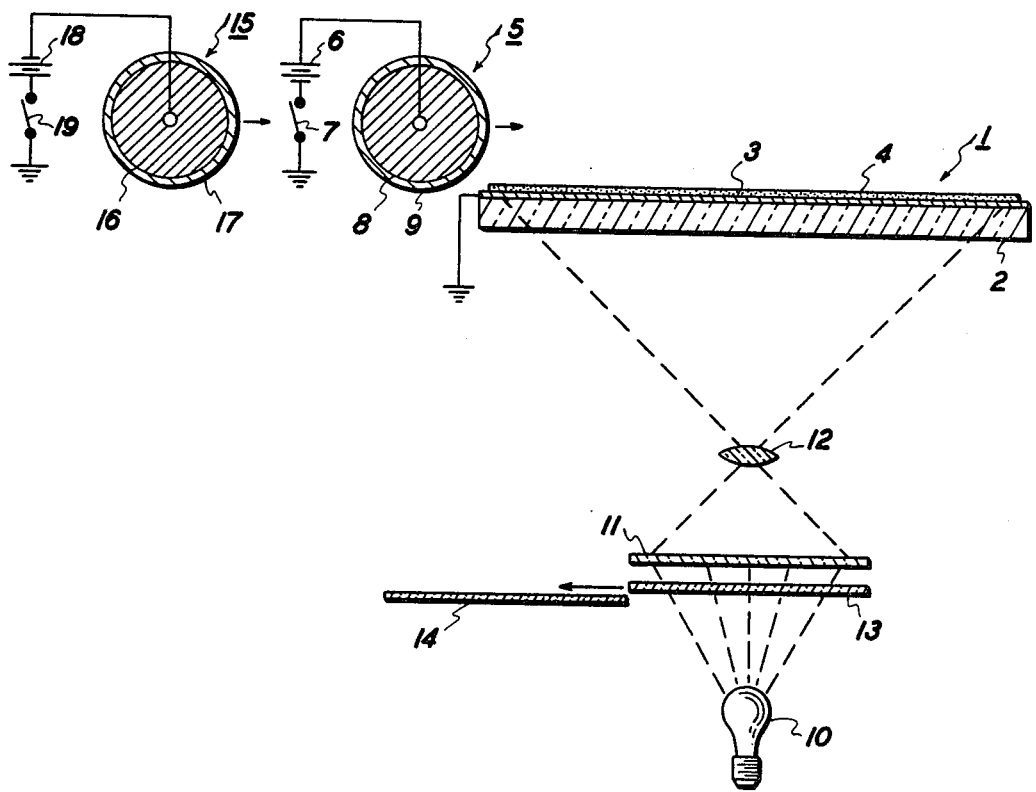
INVENTOR.
VSEVOLOD TULAGIN
BY
ATTORNEY

IMAGING SYSTEM

This is a division of U.S. application Ser. No. 675,892, filed Oct. 17, 1967.

BACKGROUND OF THE INVENTION

This invention relates to imaging systems and, more specifically, to improved electrophoretic imaging systems.

There has been recently developed an electrophoretic imaging system capable of producing monochromatic or polychromatic images which utilizes electrically photosensitive particles. This process is described in detail and claimed in copending applications Ser. Nos. 384,737 now U.S. Pat. No. 3,384,565, 384,681 abandoned in favor of continuation-in-part Ser. No. 655,023 now U.S. Pat. No. 3,384,566 and 384,680 abandoned in favor of continuation-in-part Ser. No. 518,041 now U.S. Pat. No. 3,383,993 all filed July 23, 1964. In this imaging system, colored light absorbing particles are suspended in a non-conductive liquid carrier. The suspension is placed between electrodes, subjected to a potential difference and exposed to an image. As these steps are completed, selective particle migration takes place in image configuration, providing a visible image at one or both of the electrodes. An essential component of this system is the suspended particles which must be electrically photosensitive and which apparently undergo a net change in charge polarity upon exposure to activating electromagnetic radiation, through interaction with one of the electrodes. In a monochromatic system, particles of a single color are used, producing a colored image equivalent to a conventional black-and-white photograph. In a polychromatic system, the images are produced in natural color because mixtures of particles of two or more different colors which are each sensitive to light of a specific wavelength or narrow range of wavelength are used.

Ordinarily, as further described below, the suspension is exposed to the image through a conductive transparent electrode called the injecting electrode. The other electrode called the "blocking electrode" has a substantially insulating surface and may be opaque. Ordinarily, a positive image is formed on the transparent injecting electrode while a negative image is often formed on the blocking electrode. Where it is desired that the positive copy be used on an opaque background, the image must be transferred from the transparent injecting electrode to a receiving sheet such as paper. Since this transfer step adds complexity to the system, it would be desirable to be able to form a positive image on the blocking electrode which could be the final image-supporting sheet. Also, there are problems where original input may be either positive and negative since the image formed on a given electrode would always be the same or the reverse of the original input. It would, thus, be desirable if a positive or a negative image could be selectively obtained on a given electrode. Thus, there is a continuing need, especially in monochromatic imaging, to form selective positive or negative images in a convenient and simple manner.

SUMMARY OF THE INVENTION

It is, therefore, an object of this invention to provide an electrophoretic imaging system overcoming the above-noted disadvantages.

Another object of this invention is to provide a method of selectively producing positive or negative electrophoretic images.

Still another object of this invention is to provide an electrophoretic imaging system capable of producing positive images from both negative and positive input.

The above objects and others are accomplished in accordance with this invention by incorporating in the blocking electrode in an electrophoretic imaging system a photosensitive ingredient of limited photosensitive response selected so as to cause some particles to be reflected from the blocking electrode to the injecting electrode to a greater degree than other particles.

The pigment reflection phenomenon of this invention may be also used in monochromatic electrophoretic imaging to permit an operator to selectively produce positive or negative copies of an original. In this embodiment, a photosensitive ingredient having a narrow spectral response, e.g., to red light only, is incorporated into the blocking electrode. The imaging suspension is made up of single color particles having a different narrow spectral response, e.g., to blue light. Exposing this suspension to an image by means of blue or cyan light produces a positive image on the injecting electrode and a positive image on the blocking electrode while exposing to red or white light produces a negative image on the injecting electrode and a positive image on the blocking electrode. Thus, positive or negative images can be made on the desired electrode from a specific original by merely filtering the exposure light. In this description, the particular colors mentioned are merely exemplary. In general, exposing by means of a light color to which the suspension responds will give a negative image while exposing by means of light having a color to which the blocking electrode photosensitive ingredient responds will produce a positive image on the blocking electrode. Thus, many combinations of blocking electrodes, photosensitive ingredient and imaging particles are possible.

BRIEF DESCRIPTION OF THE DRAWING

The invention may be further understood upon reference to the drawing which shows a schematic representation of apparatus for performing the improved electrophoretic imaging process of this invention.

Referring now to the FIG., there is seen a transparent electrode generally designated 1 which in this exemplary instance is made up of a layer of optically transparent glass 2 overcoated with a thin optically transparent layer 3 of tin oxide, commercially available under the name NESA glass. This electrode will hereafter be referred to as the "injecting electrode." Coated on the surface of injecting electrode 1 is a thin layer 4 of finely divided photosensitive particles dispersed in an insulating carrier liquid. The term "photosensitive" for the purposes of this application refers to the properties of a particle which, once attracted to the injecting electrode, will migrate away from it under the influence of an applied electric field when it is exposed to actinic electromagnetic radiation. For a detailed theoretical explanation of the apparent mechanism of operation of the particle migration, see the above mentioned copending applications Ser. Nos. 384,737, 384,681 and 384,680, the disclosures of which are incorporated herein by reference. For the purposes of this invention, the photosensitive particles should have a range of wavelengths of electromagentic radiation to which they are sensitive and a second range to which they are non-sensitive. The extent of these ranges is not significant. As is further pointed out below, a great many compositions have this characteristic of sensitivity to some wavelengths and insensitivity to others.

Particle suspension 4 may also contain a sensitizer and/or a binder for the pigment particles which is at least partially soluble in the suspending liquid. Adjacent to the liquid suspension 4 is a second electrode 5, hereinafter called the "blocking electrode" which is connected to one side of the potential source 6 through a switch 7. The opposite side of potential source 6 is grounded as is the conductive surface of injecting electrode 1 so that when switch 7 is closed, an electric field is applied across the liquid suspension 4 between electrodes 1 and 5. In this embodiment, electrode 5 is made in the form of a roller having a conductive central core 8 connected to the potential source 6. The core is covered with a layer of a blocking electrode material 9, which may be insulating or substantially insulating. In the system of this invention, the layer 9 will include a photosensitive ingredient which is insulating except when exposed to actinic electromagnetic radiation. The photosensitive ingredient in layer 9 should be sensitive only to a narrow range of wavelengths and substantially insensitive to another range of wavelengths. The ingredient in layer 9 should be selected with respect to the particles in suspension 4 so that particles 4 should be sensitive to radiation to which layer 9 is insensitive while layer 9 should be sensitive to other radiation to which layer 4 is insensitive. Thus, by suitable filtration of a radiation source, the system may be exposed to radiation to which either layer 9 or particles in suspension 4 would selectively respond.

An image projector made up of a light source 10, a transparency 11 and a lens 12 is provided to expose the dispersion 4 to a light image of the original transparency 11 to be reproduced. Filters 13 and 14 may be selectively interposed between light source 10 and transparency 11 to control the wavelength of the radiation directed against suspension 4.

The particle suspension is exposed to the image to be reproduced with the desired radiation while a potential is applied across the blocking and injecting electrodes by closing switch 7. Roller 5 is caused to roll across the top surface of injecting electrode 1 with switch 7 closed during the period of image exposure. Where the filter 13 or 14 is selected so that the electromagnetic radiation falling on the suspension is in the range to which the particles are sensitive but layer 9 is insensitive then a positive image corresponding to transparency 11 is formed on injecting electrode 1 with a negative image forming on blocking electrode 5. On the other hand, if the filter 13 or 14 is selected so that the radiation falling on the suspension is in the range to which layer 9 is sensitive but particles and suspension 4 is insensitive then a negative image is formed on the injecting electrode 1 with a positive image on blocking electrode 5.

While the mechanism of this image reversal is not fully understood, it is thought that where the radiation is such as to activate the imaging particles the exposed particles have charge injected thereinto and migrate to a blocking electrode 5 leaving the unexposed particles on injecting electrode 1 thus producing a positive image. Where the radiation is such that layer 9 is sensitive then charge is injectable into the particles from layer 9 in exposed areas (since in exposed areas photosensitive 9 becomes conductive). Thus, particles in exposed areas are reflected from layer 9 to the injecting electrode surface. This produces a negative image on injecting electrode 1.

After the image is formed the desired image may be cleaned from the electrode and the desired image may be preserved. Where the desired image is on blocking electrode 5, it may be fixed to layer 9 with layer 9 replaced with a new sheet of blocking electrode material for subsequent imaging operations. Where the desired image is formed on injecting electrode 1, it is desirable to transfer the particulate image to a receiving sheet to make the system ready for subsequent imaging operations. In such a case a second roller generally indicated at 15 may be provided. This transfer roller 15 comprises a conductive central core 16 having on its surface an insulating or substantially insulating receiving sheet 17. Conductive core 16 is connected through power supply 18 and switch 19 to ground. Thus, when switch 19 is closed and roller 15 is passed across the injecting electrode 1 surface after an image has been formed using blocking electrode 5, a field is imposed across the particulate image between roller 15 and injecting electrode 1. It should be noted that the sign of the potential imposed on the conductive core of roller 15 is opposite to that of the potential imposed on the core of blocking electrode 5. As transfer roller 15 passes across injecting electrode 1, the formed image transfers to the surface of receiving sheet 17. Transfer efficiency may be increased if the original image is projected onto the injecting electrode surface or said surface is flooded with white light. The image may then be fixed to the surface of receiving sheet 17 and receiving sheet 17 may be replaced with a clean sheet for further imaging operations.

The roller configuration shown for blocking electrode 5 and transfer roller 15 are merely exemplary. For example, each of these members may be in the form of an endless belt entrained around rollers or may include a web of blocking electrode material 9 or receiving sheet material 17, respectively, fed from a feed roll around the conductive cores to take up roll. Also, if the desired image is formed on blocking electrode 5 and it is not desired to preserve the image formed on injecting electrode 1, a brush or wiper blade, may be provided to clean the surface of injecting electrode 1 between imaging cycles.

Any suitable electrically photosensitive material having the desired spectral response characteristics may be used in the particulate suspension or in the blocking electrode surface layer. Most photosensitive materials have the desired electrical spectral response characteristics. For example, cyan colored particles are generally primarily responsive to red light, yellow colored particles are generally primarily responsive to blue light and magenta colored particles are generally primarily responsive to green light.

For many uses, it would be preferred to use a black or darkly colored photosensitive material which had a range of radiation wavelengths to which it did not respond. On the other hand, for some uses a white-appearing material might be preferred. Many white-appearing photosensitive materials have their primary response in the ultraviolet region. These particles could be used with a special effectiveness in conjunction with a colored photosensitive material responsive to visible light but substantially non-responsive to ultraviolet light. An excellent combination might consist of a white-appearing ultraviolet sensitive material on the surface of the blocking electrode with black-appearing photosensitive particles in the suspension which are substantially transparent to ultraviolet light. This would simplify the production of black-on-white copies. Typical materials which have photosensitive response substantially limited to ranges of wavelengths of electromagnetic radiation include: Algol Yellow GC, 1,2,5,6-di(C,C'-diphenyl)-thiazole-anthraquinone (General Dyestuffs); Graphthol Rhodamine, the molybdenum lake of 3,6-bis (diethylamino)-9,2'-carbethoxy phenyl xanthenonium chloride (Sandoz Inc.); Bonadur Red B, 1-(4'-ethyl-5'-chloroazobenzene-2'-sulfonic acid)-2-hydroxy-3-naphthoic acid calcium lake (American Cyanamide); Indanthrene Brilliant Orange RK, 4,10-dibromo-6,12-anthanthrone (General Dyestuffs); Calcium Lithol Red, a calcium lake of 1-(2'-azonaphthalene-1'-sulfonic acid)-2-naphthol (Collway Colors); Indofast Violet Lake, a dichloro-9,18-isoviolanthrone (Harmon Colors); Cyan Blue GTNF, the beta form of copper phthalocyanine (Collway Colors); Indofast Yellow Toner, flavanthrone (Harmon Colors); Cyan Green 15–3100, a chlorinated copper phthalocyanine (American Cyanamide); Methyl Violet, a phosphotungstomolybdic lake of 4-(N,N', N'-trimethyl anilino)-methylene-N'', N''-dimethylanilinium chloride (Collway Colors); Diane Blue, 3,3'-methoxy-4,4'-diphenyl-bis(1''-azo-2''-hydroxy-3''-naphthanilide) (Harmon Colors); Monolite Fast Blue GS, a mixture of alpha and beta metal-free phthalocyanine (Arnold Hoffman Company); Duol Carmine, a calcium lake of 1-(4'-methylazobenzene)-2'-sulfonic acid)-2-hydroxy-3-naphthoic acid (E. I. du Pont de Nemours & Co.); Naphthol Red B, 1-(2'-methoxy-5'-nitrophenylazo)- 2-hydroxy-3''-nitro-3-naphthanilide (Collway Colors); Quindo Magenta RV–6803, a substituted quinacridone (Harmon Colors); Vulcan Fast Red BBE, 3,3'-dimethoxy-4,4'-biphenyl-bis (1'-phenyl-3''-methyl-4''-azo-2''-pyrazolin-5''-one) (Collway Colors); Watchung Red B, 1-(4'-methyl-5'-chloroazobenzene-2'-sulfonic acid)-2-hydroxy-3-naphthoic acid (E. I. du Pont de Nemours & Co.); and mixtures thereof. Other typical electrically photosensitive pigments include the following described in the noted copending applications: 8,13-dioxodinaphtho-(1,2-2',3')-furan-6-carbox-4''-methoxyanilide (Ser. No. 421,377 now U.S. Pat. No. 3,448,029, filed Dec. 28, 1964); 1-cyano-2,3-(3'-nitro)-phthaloyl-7,8-benzopyrrocoline (Ser. No. 445,235 now U.S. Pat. No. 3,402,177, filed Apr. 2, 1965); N-2''-pyridyl-8,13-dioxodinaphtho-(1,2-2',3')-furan-6-carboxamide (Ser. No. 421,281 now U.S. Pat. No. 3,447,922, filed Dec. 28, 1964); various quinacridones as disclosed in application Ser. No. 468,935, filed July 1, 1965; anthraquinones as disclosed in application Ser. No. 467,344 now abandoned, filed June 28, 1966; azo pigments as disclosed in application Ser. No. 473,607 abandoned in favor of continuation-in-part Ser. No. 737,689 filed June 17, 1968, filed July 21, 1965; dioxazine pigments as disclosed in application Ser. No. 519,104 now U.S. Pat. No. 3,442,781, filed Jan. 6, 1966; phthalocyanines as disclosed in application Ser. No. 560,603, filed June 27, 1966.

DESCRIPTION OF PREFERRED EMBODIMENTS

The following examples further specifically define the present invention with respect to the selective formation of positive and negative photoelectrophoretic images. Parts and percentages are by weight unless otherwise indicated. The examples are intended to illustrate the various preferred embodiments of the process of the present invention.

All of the following examples are carried out in apparatus of the general type illustrated in the FIGURE with the imaging mix 4 coated on a NESA glass substrate through which exposure is made. The NESA glass surface is connected in series with a switch, a potential source and a conductive center of a blocking electrode having a sensitized layer on its surface. After images are formed, the NESA glass surface is connected in series with a switch, a second potential source and the conductive center of the transfer roller. A negative potential of about 3,000 volts is imposed on the core of the blocking electrode roller while a positive potential of about 3,000 volts is imposed on the core of the transfer roller. Each roller is approximately 2½ inches in diameter and is moved across the plate surface at about 4 centimeters per second. The plate employed is roughly 3 inches square and is exposed with an unfiltered white light intensity of about 8,000 foot-candles as measured on the uncoated NESA glass surface. Unless otherwise indicated, about 7 percent by weight of the indicated pigment in each example is suspended in Sohio Odorless Solvent 3,440, a kerosene fraction available from the Standard Oil Company of Ohio. Exposure is made with a 3,200° K. lamp through a conventional black-and-white transparency and the filter is mentioned in the specific examples.

EXAMPLE I

The surface of the blocking electrode is sensitized by dispersing a finely divided photosensitive cyan-colored pigment, Moholite Fast Blue GS, the alpha form of metal-free phthalocyanine, C. I. No. 74,100, available from the Arnold Hoffman Company, in Sohio Odorless Solvent 3,440. A cotton wad is dipped in this dispersion and rubbed on the surface of a sheet of Baryta paper. The Sohio Odorless Solvent 3,440 is allowed to evaporate leaving a blue-green colored surface on the Baryta paper. The phthalocyanine particles do not form a uniform coating but are dispersed on and embedded in the paper surface. The sensitized paper is then wrapped around a roller electrode as shown in FIG. 1. A particle suspension is prepared consisting of about seven parts of a photosensitive magenta pigment, Watchung Red B, a barium salt of 1-(4'-methyl-5'-chloroazobenzene-2'-sulfonic acid)-2-hydroxy-3-naphthoic acid, C. I. No. 15,865, available from E. I. du Pont de Nemours & Co., in about 100 parts Sohio Odorless Solvent 3,440. The surface of the NESA glass is coated with this suspension. A Wratten 29 filter (which transmits only red light) is placed between the light source and the transparency to be copied. A potential is imposed between the blocking electrode core and the injecting electrode and the blocking electrode is passed across the imaging suspension. Since the suspended magenta pigment particles do not absorb the red light while the phthalocyanine-sensitized blocking electrode surface does absorb red light, a negative image is formed on the NESA electrode and a positive image on the blocking electrode surface. The transfer roller is then passed across the injecting electrode while a positive potential is imposed on the transfer roller core. The particulate image transfers to the surface of the transfer roller where it may be fixed by laminating a clear film thereover.

The surface of the blocking electrode is cleaned and a fresh transfer sheet is wrapped around the transfer roller. The surface of the injecting electrode is again coated with a dispersion of Watchung Red B particles in Sohio Odorless Solvent 3,440. Instead of the Wratten 29 filter, a Wratten 61 filter is placed between the light source and the transparency to be copied. This permits only green light to fall on the injecting electrode. The blocking electrode is again passed across the injecting electrode surface. Here, the blue-green blocking electrode surface does not absorb the green light while the red-magenta particles do absorb the green light. Thus, a positive image is formed on the NESA electrode with a negative image on the blocking electrode surface. The image formed on the injecting electrode surface is then transferred by passing the transfer electrode again across the injecting electrode.

Good quality positive and negative images are thus produced on a receiving sheet merely by shifting filters into and out of the light path of the projection system.

Example II

Particles of a finely divided yellow pigment, N-2"-pyridly-8,13-dioxodinaptho-(1,2-2',3')-furan-6-carboxamide, prepared by the process described in copending application Ser. No. 421,281, filed Dec. 28, 1964 is applied to the surface of a Baryta sheet as described in Example I above. An imaging suspension is prepared by dispersing finely-divided particles of Monolite Fast Blue GS in Sohio Odorless Solvent 3,440. Two imaging cycles as described above are then performed. The first is produced with a Wratten 29 filter in the projection system. This filter permits only red light to pass, which is absorbed by the cyan-colored particle but is not absorbed by the yellow particles on the blocking electrode surface. Thus, a positive image is produced on the injecting electrode surface. In the second imaging cycle, a Wratten 47b filter is used. This filter permits only blue light to pass. The yellow particles on the blocking electrode surface will absorb the blue light but the cyan-colored imaging particles will not absorb the blue light. Thus, a negative image is produced on the injecting electrode surface. Each image is transferred to a receiving sheet and fixed thereon.

Although specific components and proportions have been described in the above examples relating to the selective formation of positive and negative electrophoretic images, other suitable materials, as listed above, may be used with similar results. In addition, other materials may be added to the electrodes, particles or particle-carrier suspension to synergize, enhance of otherwise modify their properties. For example, the particles in the suspension or the photosensitive blocking electrode surface may be dye-sensitized or electrically sensitized, if desired.

Other modifications and ramifications of the present invention will occur to those skilled in the art upon a reading of the present disclosure. These are intended to be included within the scope of this invention.

What is claimed is:

1. Photoelectrophoretic imaging apparatus comprising
a first substantially transparent electrode and a second electrode containing an electrically photosensitive layer said first and second electrodes supported to virtually contact one another and having means for coupling to a voltage source to establish an electrical field between said electrodes, and
exposure means for projecting activating electromagnetic radiation through said first electrode toward said second electrode.

2. The apparatus of claim 1 and further including light filtering means for limiting the wavelength range of the activating electromagnetic radiation.

3. The apparatus of claim 1 wherein said electrically photosensitive layer is sensitive to radiation of wavelengths other than the wavelengths to which an imaging suspension adjacent said electrically photosensitive layer is sensitive.

* * * * *